(12) United States Patent
Volk (10) Patent No.: US 12,179,270 B2
(45) Date of Patent: Dec. 31, 2024

(54) SUCTION DEVICE, AND APPARATUS FOR PRODUCING A THREE-DIMENSIONAL COMPONENT

(71) Applicant: One Click Metal GmbH, Tamm (DE)

(72) Inventor: Michael Volk, Ludwigsburg (DE)

(73) Assignee: One Click Metal GmbH, Tamm (DE)

( * ) Notice: Subject to any disclaimer, the term of this patent is extended or adjusted under 35 U.S.C. 154(b) by 247 days.

(21) Appl. No.: 17/814,906

(22) Filed: Jul. 26, 2022

(65) Prior Publication Data
US 2023/0035880 A1 Feb. 2, 2023

(51) Int. Cl.
| | |
|---|---|
| *B33Y 30/00* | (2015.01) |
| *B22F 10/322* | (2021.01) |
| *B22F 12/70* | (2021.01) |
| *B28B 1/00* | (2006.01) |
| *B33Y 40/00* | (2020.01) |

(52) U.S. Cl.
CPC ............. *B22F 12/70* (2021.01); *B28B 1/001* (2013.01); *B33Y 30/00* (2014.12); *B33Y 40/00* (2014.12)

(58) Field of Classification Search
CPC ......... B33Y 30/00; B33Y 40/00; B22F 12/70; B22F 10/28; B22F 10/77; B22F 10/322; B29C 64/153; B29C 64/25; B29C 64/30; B29C 64/364; B29C 64/371; B28B 1/001
See application file for complete search history.

(56) References Cited

U.S. PATENT DOCUMENTS

| | | | | |
|---|---|---|---|---|
| 2018/0133637 A1* | 5/2018 | Stammberger | ........ | B22F 10/322 |
| 2019/0262901 A1* | 8/2019 | Huebinger | ............ | B29C 64/371 |
| 2020/0262140 A1* | 8/2020 | Zaiss | ..................... | B29C 64/245 |
| 2021/0094234 A1* | 4/2021 | Patel | ...................... | B29C 64/20 |

FOREIGN PATENT DOCUMENTS

| | | |
|---|---|---|
| DE | 102015106219 A1 | 10/2016 |
| DE | 102017125838 A1 | 5/2019 |
| DE | 102018119993 A1 | 2/2020 |
| EP | 3023228 A1 | 5/2016 |

* cited by examiner

*Primary Examiner* — Galen H Hauth
*Assistant Examiner* — Baileigh Kate Darnell
(74) *Attorney, Agent, or Firm* — Renner, Otto, Boisselle & Sklar, LLP.

(57) ABSTRACT

A suction device for sucking a process gas from a process chamber and to an apparatus for producing a three-dimensional component by selectively solidifying a building material, applied layer by layer, by means of a beam acting on the building material, having an suction tube which at one end has an outlet opening at an end face, to which an suction line can be connected, having an intake opening which extends in the longitudinal direction of the suction tube and is slot shaped, wherein there is provided at the outlet opening of the suction tube a connection port which can be inserted into a connection interface on or in the process chamber, and at the opposite end of the suction tube there is provided a holding element which is releasably held by a holding device associated with an opening of the process chamber.

19 Claims, 6 Drawing Sheets

SUCTION DEVICE, AND APPARATUS FOR PRODUCING A THREE-DIMENSIONAL COMPONENT

The invention relates to an suction device for sucking a process gas from a process chamber of an apparatus for producing a three-dimensional component, and to such an apparatus.

An apparatus for producing a three-dimensional component by selectively solidifying a building material, applied layer by layer, by means of a beam, in particular a laser beam, acting on the building material is known from EP 3 023 228 A1 and DE 10 2017 125 838 A1. This apparatus is an apparatus for the additive manufacture of components. During the solidification of the building material, protective gas is fed to the process chamber from a protective gas circulation system via an inlet opening and contaminated process gas is sucked from the process chamber via an intake opening. This protective gas serves to protect against oxidation during production of the three-dimensional component. At the same time, smoke, fumes and other particles which can impair the process of producing the three-dimensional component are thereby sucked.

For feeding in the protective gas, inlet openings are provided in a door that closes the opening of the process chamber. The intake opening for discharging the process gas from the process chamber is provided at an opposite rear wall of the process chamber. A direction of flow of the protective gas from the door along a work surface, which is formed by the base of the process chamber, and at least over the building platform to the rear side of the process chamber is thereby generated. In this configuration, it is necessary that an interface is provided between the door and an adjacent wall region of the process chamber in order to transfer the protective gas into the process chamber and feed it to the inlet openings when the door is closed. In addition, owing to turbulence within the process chamber, it can happen that individual particles of the building material accumulate at the edge of the opening of the process chamber between the door and a seal and fall out when the door is opened.

The object underlying the invention is to propose an suction device for sucking a process gas from a process chamber, and an apparatus for producing a three-dimensional component by selectively solidifying a building material applied layer by layer, in which reduced powder deposition, in particular between a door and an opening of the process chamber, is achieved.

This object is achieved by an suction device for sucking a process gas from a process chamber of an apparatus for producing a three-dimensional component by selectively solidifying a building material, applied layer by layer, by means of a beam acting on the building material, which suction device comprises an suction tube, which at one end has an outlet opening at an end face, to which an suction line can be connected, and comprises an intake opening which extends in the longitudinal direction of the suction tube and is slot-shaped, wherein there is provided at the outlet opening of the suction tube a connection port which can be inserted into a docking interface on or in the process chamber, and at the opposite end of the suction tube there is provided a holding element which is configured to be releasably fastened to a holding device associated with an opening of the process chamber.

Such an suction device, in which the suction tube is releasable with respect to the suction line and the holding device, can adjoin an opening of the process chamber and be provided separately from the door that closes the opening. Contaminated process gas is thereby sucked through the intake opening of the suction tube and the deposition of building material, dirt particles, fumes and the like in a sealing gap between the opening of the process chamber and the door is prevented. At the same time, the releasable arrangement of the suction tube by means of the holding device allows easy access to the process chamber after the suction tube has been removed from the process chamber. In addition, there is the advantage that, for example when changing the building material for the subsequent production of a three-dimensional component, the removal of the suction tube from the process chamber permits easier cleaning. In addition, different suction tubes, or suction tubes with different intake openings, specific to a particular application can be used in order correspondingly to optimize the flow behavior of the protective gas in the process chamber.

The connection port of the suction tube preferably has a rounded transition between its end face and its cylindrical portion. This permits easier insertion into a docking interface in the process chamber.

The suction device preferably comprises an adapter which can be fastened in a side wall of the process chamber and has at one end a receiving socket in which the connection port of the suction tube can be inserted to form the docking interface. On the opposite side, the adapter comprises a tubular section which can be connected to the suction line. This adapter has the advantage that the size of the through-passage in the side wall can be standardized, and easy adaptation to different sizes of suction tubes is possible by means of different adapters.

The adapter preferably has a radially outwardly directed circumferential shoulder for positioning at a through-opening in a side wall of the process chamber. A defined position of the adapter relative to the process chamber is thereby possible. The circumferential shoulder can advantageously have a flattened portion, so that a defined installation position and a rotationally fixed arrangement are possible.

The receiving socket of the adapter, into which the connection port of the suction tube can be inserted, preferably has on the inside a radially oriented end face in which a seal is provided. After the connection port of the suction tube has been inserted into the receiving socket of the adapter, the end face of the connection port abuts the seal, so that sealing is provided in the axial direction.

Furthermore, it is preferably provided that the receiving socket of the adapter engages externally around the connection port of the suction tube and the seal provided on a cylindrical portion of the connection port forms a radial seal between the receiving socket and the connection port. A sealed docking interface can thus be formed, in order to achieve a high extraction action of the contaminated protective gas via the suction tube.

The suction tube of the suction device preferably has on an underside of the intake opening a bearing surface which has one or more alignment elements for positioning the suction tube relative to the base of the process chamber. A defined alignment of the suction tube with the opening of the process chamber can thus be made possible.

In particular, the at least one alignment element on the underside of the intake opening is formed by side edges of a bearing surface, which can be positioned in a depression in the base of the process chamber. This bearing surface can be formed by a lower wall portion of the intake opening. By the arrangement of this bearing surface in the depression in the base of the process chamber, it is possible to provide, in addition to the alignment of the suction tube, also a common plane between a work surface on the base of the process chamber and an inner wall of the intake opening, so that a step-free transition is provided. Furthermore, a recess can be provided in the lower bearing surface, by means of which the bearing surface can be inserted with an accurate fit into a depression in the base of the process chamber.

The holding device of the suction device preferably receives the holding element of the suction tube by frictional and/or interlocking engagement. A connection that can be released quickly and easily can thus be made possible, in order on the one hand to shorten the handling time and on the other hand to permit secure positioning and fixing of the suction tube in the process chamber during operation.

The holding device is in particular in the form of a clip, preferably a U-shaped clip, which has resiliently flexible holding lugs. The holding element is in this case preferably in the form of a cylindrical body which can be inserted from above between the resiliently flexible holding lugs. This configuration has the advantage that no moving parts are provided. In addition, such a holding device is easy to handle and to clean. The holding element can at the same time serve as a handle for holding the suction tube.

Furthermore, the connection port can preferably be releasably connected to the suction tube or can be formed in one piece. In the case of the releasable connection, rapid adaptation to a connection geometry when processes in the process chamber are changed can again be made possible.

The object underlying the invention is further achieved by an apparatus for producing a three-dimensional component by selectively solidifying a layered building material by means of a beam acting on the building material, which apparatus has a process chamber with a base which comprises a work surface in an X-Y plane, and comprises at least one building platform which can be moved up and down relative to the work plane and on which the three-dimensional component is built, and has an application and levelling device which is displaceable along the work surface and transfers powdered building material onto the building platform, and with a protective gas circulation system which has an inlet opening for feeding into the process chamber and an intake opening for discharging contaminated process gas from the process chamber, and having an opening which is provided on a front side of the process chamber and can be closed by a door, wherein the intake opening is provided in an suction tube of an suction device according to one of the above-described embodiments and the suction tube can be removed from the process chamber.

This arrangement makes possible a flow of process gas within the process chamber, in which the extraction of the process gas takes place towards the opening of the process chamber which can be closed by the door. After opening the door, the suction tube can be removed, and the three-dimensional component which has been produced is accessible. This arrangement has the advantage that deposits of building material, dirt particles or the like in a sealing gap between the door and the opening of the process chamber are prevented, since these substances are drawn in via the suction device. The suction device, when seen in the direction of flow of the process gas, is positioned upstream of the seal of the door. Thus, when the door is opened, powder deposits are prevented from falling out of or down from the process chamber. However, the process chamber is at the same time highly accessible owing to the removable or replaceable suction tube.

The suction device is preferably positioned adjacent to the opening of the process chamber, and at least one inlet opening for feeding in the process gas is preferably provided at least in the rear wall of the process chamber and/or in at least one side wall. Depending on the size and/or the number of inlet openings in the process chamber, a stream of process gas which flows at least over the entire building platform can be achieved.

Furthermore, a through-passage is preferably provided in a side wall adjacent to the opening of the process chamber, into which through-passage the adapter can be inserted. The suction line can be connected to the tubular section of the adapter outside the process chamber. By means of this adapter, a simple connection between the connection port of the suction tube and the suction line can thus be created. By means of the adapter, the docking interface into which various suction tubes with various geometries of the intake openings can also easily be inserted is created.

According to a further preferred embodiment of the apparatus, the holding device is provided on the opposite side to the through-passage and associated with the side wall of the process chamber. This holding device can be fastened to the work surface or to the side wall of the process chamber. An intake opening of the suction tube can thereby extend over a maximum possible length to the work surface in order to permit improved extraction of the contaminated process gas.

Furthermore, the base of the process chamber preferably has a depression adjacent to the opening of the process chamber, which depression preferably extends between the through-passage in one side wall and the holding device of the opposite side wall. A wall of the intake opening in the suction tube can thus be positioned in the depression so that the plane of the work surface is flush with an inner wall surface of the intake opening.

Furthermore, the suction tube, for positioning in the process chamber, can first be inserted with the connection port into the adapter and then, preferably by means of a pivoting movement, while maintaining the connection of the connection port in the connection socket of the adapter, the holding element can be fixed in the holding device. A fitting or pushing-on movement is thereby sufficient to create the friction-based and/or interlocking connection between the holding element and the holding device.

The invention and further advantageous embodiments and further developments thereof will be described and explained in detail in the following text by means of the examples shown in the drawings. The features which are to be found in the description and the drawings can be applied according to the invention individually on their own or in a plurality in any desired combination. In the figures:

Figure 1:
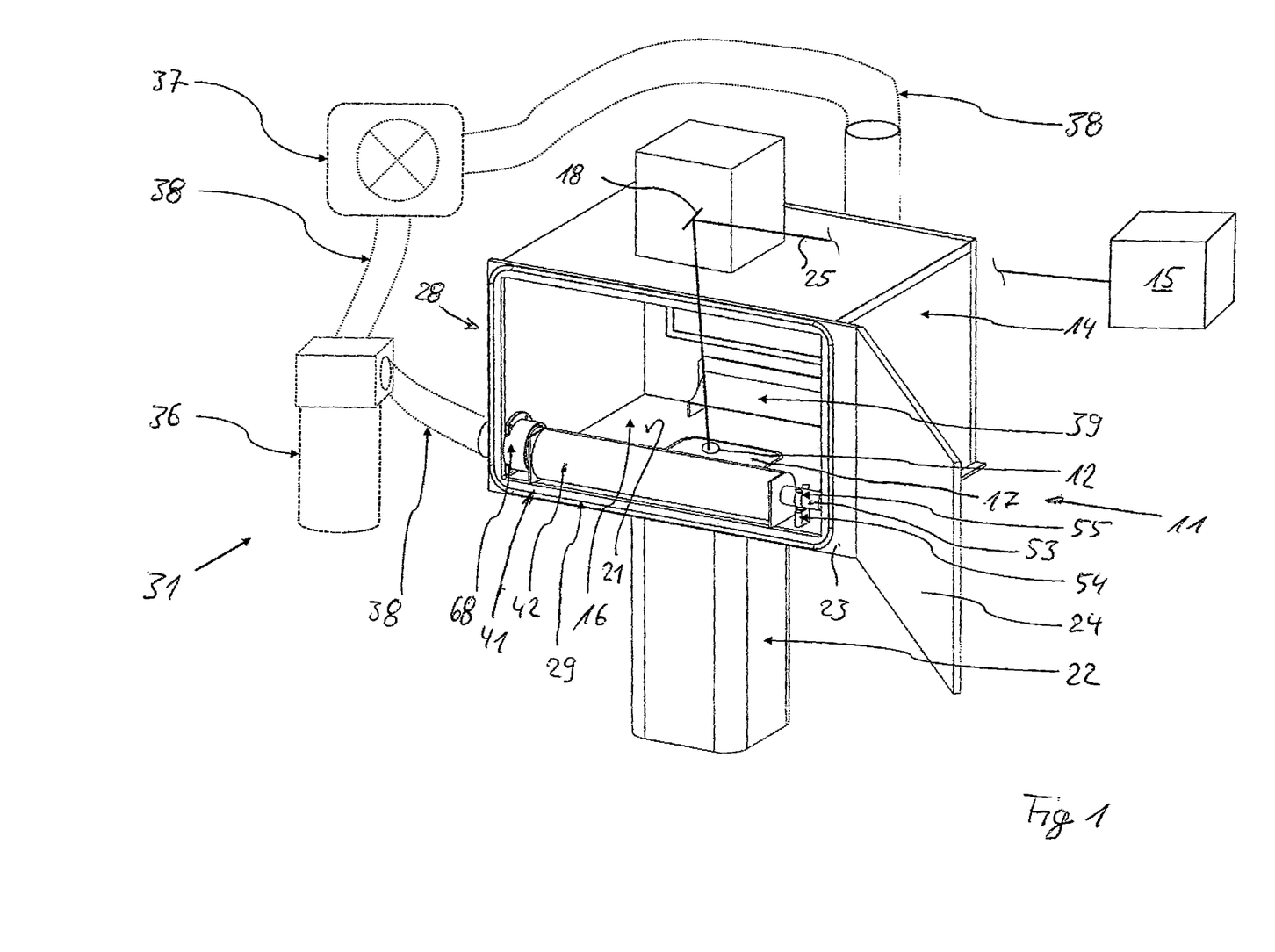
FIG. 1 is a perspective view of an apparatus for producing a three-dimensional component.
Figure 2:
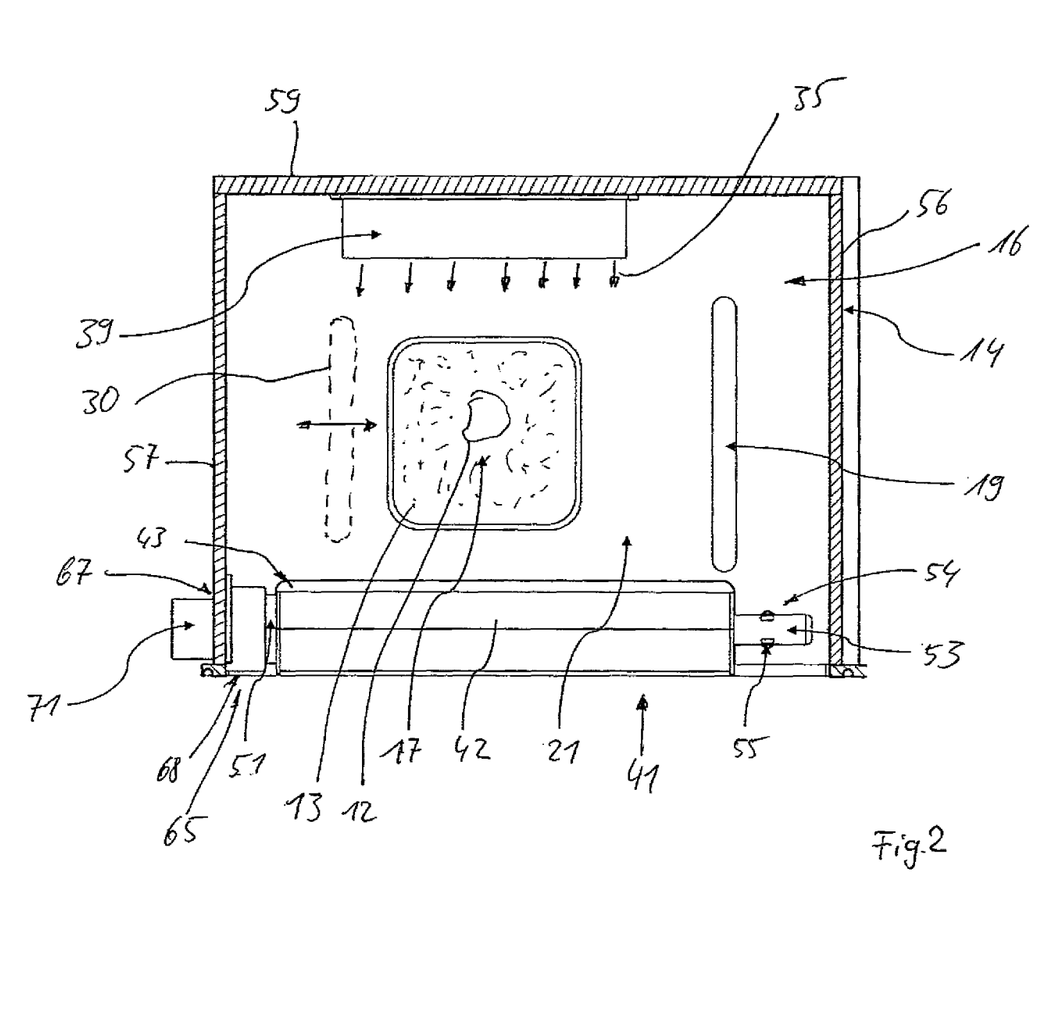
FIG. 2 is a schematic view from above of a work surface of a process chamber of the apparatus according to FIG. 1.

FIG. 1 shows a perspective view of an apparatus 11 for producing three-dimensional components 12 by selective solidification of a building material applied layer by layer. Of this apparatus 11, a process chamber 16 is shown in detail and the further components are shown schematically. FIG. 2 shows a view from above of the process chamber 16. Such apparatuses 11 are also referred to as 3D printing systems, selective laser sintering machines, selective laser melting machines or the like. This apparatus 11 comprises a housing 14 in which the process chamber 16 is provided. This process chamber 16 is closed to the outside and is accessible, for example, via a door 24, which preferably comprises a safety closure and a handle. This door 24 is provided on a front side 23 of the housing 14 and closes an opening 28 in the process chamber 16. A seal 29 which extends externally around the opening 28 is provided, in order to hermetically seal the process chamber 16. The seal 29 can be provided on the door 24 or on the front side 23 of the housing 14.

A base 21 is oriented in the X-Y plane in the process chamber 16. A building platform 17 on which the three-dimensional component 12 is produced layer by layer is provided so as to be displaceable relative to this base 21. This building platform 17 can be moved in the Z-direction relative to the work surface, which is formed by the base 21 of the process chamber 16. The building platform 17 is preferably provided in an interchangeable container 22 or build cylinder module. Adjacent to the building platform 17 there is provided, for example, an overflow container or an overflow slot 19 with a container, preferably a removable container, positioned beneath it, in which building material 13 that is not required or that has not solidified is collected. A storage container by means of which fresh building material 13 is provided can further be provided. By means of an application and levelling device 30, on the one hand this building material 13 can be fed to the building platform 17 and on the other hand unrequired or excess building material 13 can be transferred into the overflow container 19. This application and levelling device 30 can also have a metering device for feeding building material 13. In this case, the storage container can be omitted. This application and levelling device 30 is moved along the work surface by a drive unit (not shown in detail).

The building material 13 preferably consists of a metal powder or ceramics powder. Other suitable materials employed for laser melting or laser sintering can also be used.

A beam source 15, such as, for example, a laser source, is provided above the building platform 17 on the housing 14 or adjacent thereto. The beam source 15 emits a beam 25 which is deflected onto the work surface, in particular the building platform 17, via a beam deflection device 18. The beam deflection device 18 can be in the form of one or more controllable mirrors, in particular in the form of a scanner. The beam deflection device 18 can additionally also comprise optical elements for focusing the beam 25.

The process chamber 16 is hermetically sealed. For producing the three-dimensional component 12, the process chamber is filled with a protective gas, in particular an inert gas, in order to avoid oxidation on melting of the building material 13.

For feeding in and discharging the process gas, which corresponds to the contaminated protective gas, a protective gas circulation system 31 is provided. This protective gas circulation system 31 comprises a filter device 36 and a low pressure generating device 37 for generating a gas flow. Starting from the filter device 36, protective gas is fed via a conveying line 38 to at least one inlet opening 39, which is arranged in a wall of the process chamber 16. This inlet opening 39 can be provided in a rear wall 59. Alternatively, the inlet opening 39 can also be provided in one or both side walls 56, 57 and/or in the rear wall 59.

For sucking the process gas that is fed in there is provided an suction device 41, which is associated with the opening 28. This suction device 41 comprises an suction tube 42. The suction tube 42 comprises an intake opening 43, which is preferably slot-shaped and is oriented towards the building platform 17. The process gas drawn in via the suction tube 42 is guided out of the process chamber 16 and fed to the filter device 36 via an suction line 46.

By means of the protective gas circulation system 31 there is generated a protective gas stream according to the arrows 35, which passes through the process chamber 16 above the work surface. Sheathing of the building material 13 with protective gas during the selective solidification of the building material 13 by the beam 25 can thereby be achieved. In addition, soot, smoke or other impurities or dirt particles that form can be drawn in by this protective gas stream 35 via the intake opening 43 of the suction tube 42 and discharged.

The above-described protective gas stream 35 generated by the protective gas circulation system 31 is referred to as the primary stream. In addition, a secondary stream can also be generated by the protective gas circulation system 31. To this end, further inlet openings are preferably provided in a ceiling 58 of the process chamber 16 or in side walls 56, 57 and/or the rear wall 59 of the process chamber 16.

The suction tube 42 of the suction device 41 is positioned adjacent to the opening 28. The intake opening 43 of the suction tube 42 is oriented facing the building platform 17.

The suction device 41 comprises the suction tube 42 with a connection port 51. A holding element 53 is provided on the opposite side to this connection port 51 at a closed end of the suction tube 42. The suction device 41 further comprises the holding device 54, which can be fastened in the process chamber 16. The holding element 53 on the suction tube 42 is releasably connected to the holding device 54. This holding device 54 is fastened to the base 21 or to the adjoining side wall 56 of the process chamber 16. The holding element 53 is in the form of a cylindrical tube, for example. The cylindrical tube can at the same time form a handle, in order to allow the suction tube 42 to be inserted into and removed from the process chamber 16.

The holding device 54 engages the holding element 53 by interlocking or frictional engagement. The holding device 54 is advantageously formed by a clip, for example comprising holding lugs 55. This clip has upwardly widened end portions for easy insertion of the holding element 53. Such a holding device 54 in the form of a bent sheet-metal part has no moving parts or joints and is thus easy to clean.

On the opposite side to the holding device 54, a connection port 51 is provided on the suction tube 42. This connection port 51 is connected to an adapter 68. The connection port 51 and the adapter 68 form a docking interface 65. The adapter 68 is fastened in a through-passage 67 in the side wall 75 of the process chamber 16. The adapter 68 has a tubular section 71 arranged outside the process chamber 16, to which the suction line 46 can be connected.

Figure 3:
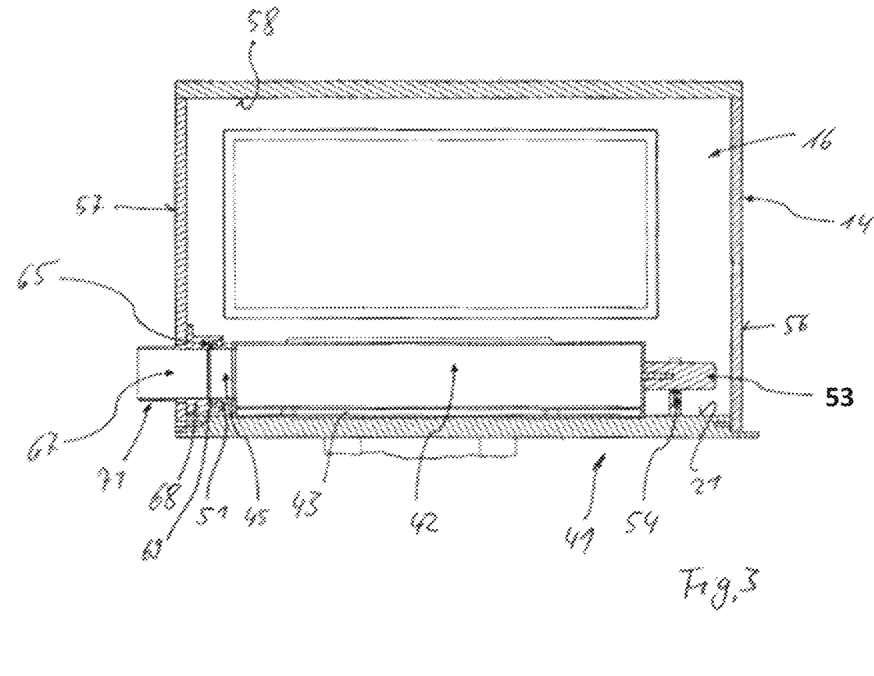
FIG. 3 is a schematic sectional view from the front of the suction device according to FIG. 1.

FIG. 3 shows a schematic sectional view of the process chamber 16 and the suction device 41. The construction of the docking interface 65 can be seen in this sectional view according to FIG. 3, wherein reference will be made for the description of this docking interface 65 to FIG. 4, which shows the suction tube 42 in a perspective view, and to FIG. 5, which shows the process chamber 16 in a perspective view with the suction tube 42 removed. The adapter 68 comprises an external circumferential shoulder 74, which is provided to abut the side wall 57 of the process chamber 16 and to fasten the adapter 68 to the side wall 57. Facing the suction tube 42, the adapter 68 comprises a receiving socket 69. On the inside of this receiving socket 69 there is provided a radially oriented end face 72. A seal 73 (FIG. 5) is positioned in this end face 72. The connection port 51 of the suction tube 42 can be inserted in this receiving socket 69. According to FIG. 4, this connection port 51 has an end face 61. Starting from this end face, a rounded transition 62 extends into a cylindrical portion 63. A circumferential seal 64, in particular an O-ring seal, is provided in this cylindrical portion 63. The connection port 51 is preferably provided in one piece on the suction tube 42.

Figure 6:
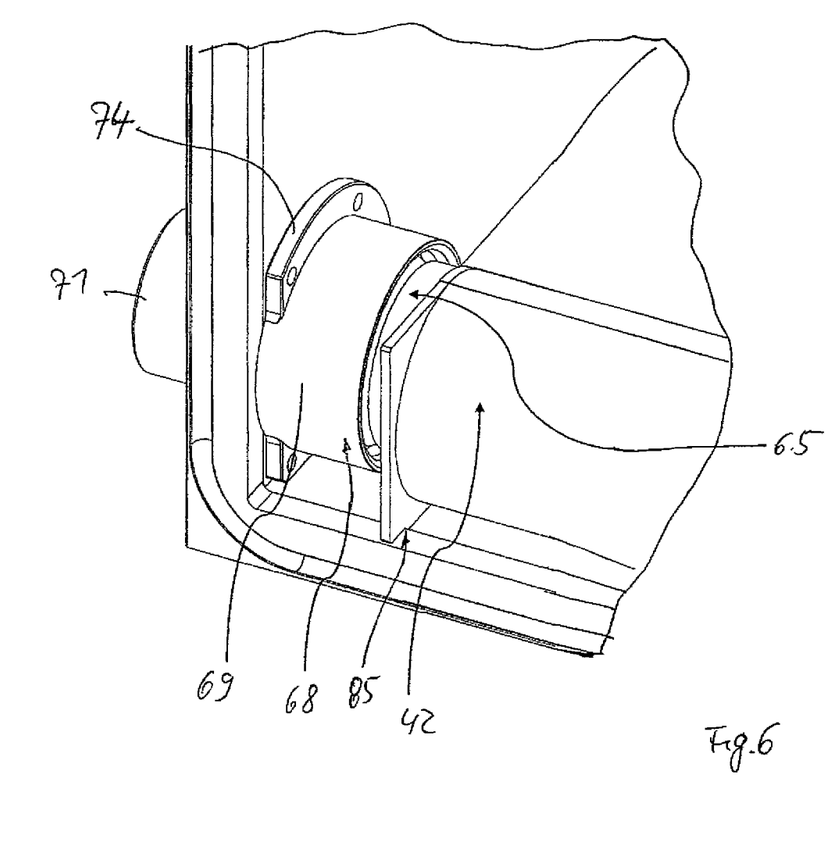
FIG. 6 is a perspective and enlarged view of a docking interface in the process chamber.

After the connection port 51 of the suction tube 42 has been inserted and positioned in the receiving socket 69 of the adapter 68, a sealed connection interface 65, which is shown schematically on an enlarged scale in FIG. 6, is formed. By means of the seal 73 arranged at the end face 72 inside the receiving socket 69, an axial seal between the adapter and the suction tube is created. By means of the seal 64 on the cylindrical portion 63 of the connection port 61 with the receiving socket 69 of the adapter 68, a radial seal is provided.

Figure 4:
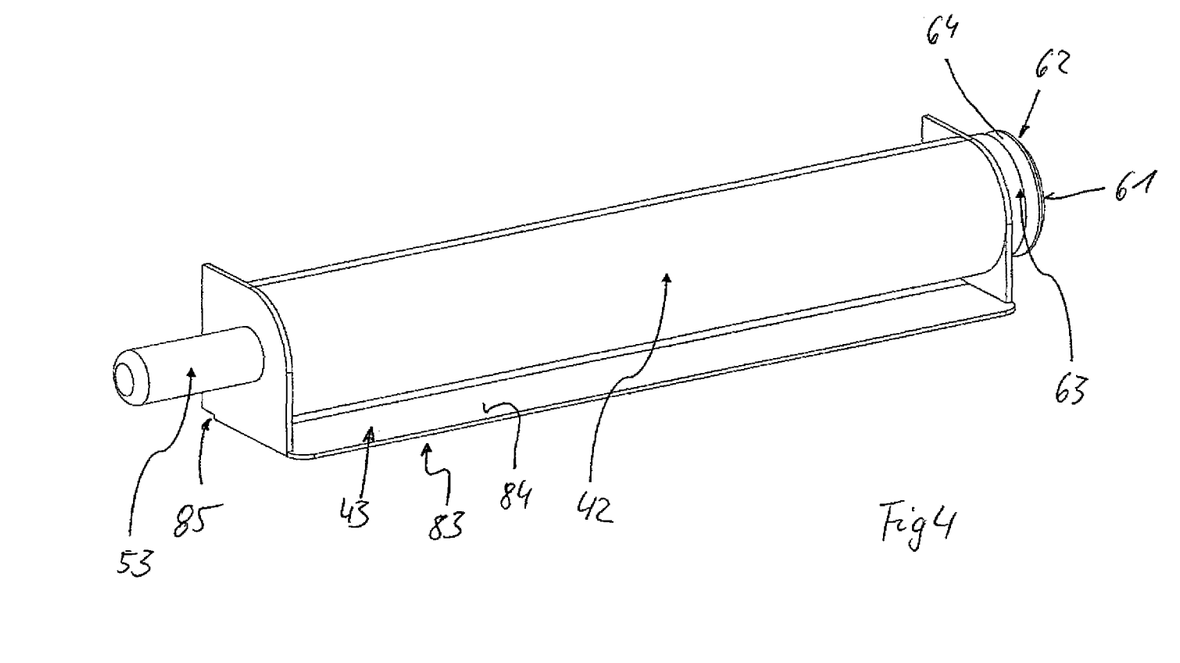
FIG. 4 is a perspective view of an suction tube of the suction device.

FIG. 4 shows a perspective view of the suction tube 42 with the connection port 51 and the holding element 53. The slot-shaped intake opening 43 preferably extends over the entire length of the suction tube 42. This suction tube 42 can be in the form of a ribbed or cyclone tube in order to permit improved discharge through the connection port 51 of the process gas that has been drawn in.

The intake opening 43 is delimited at its underside by a wall portion 84. This wall portion 84 has on its outer side or underside a rest surface 83. Furthermore, a recess which forms an alignment element 85 is provided on the opposite side to the intake opening 43. This will be described in connection with the following FIG. 5.

Figure 5:
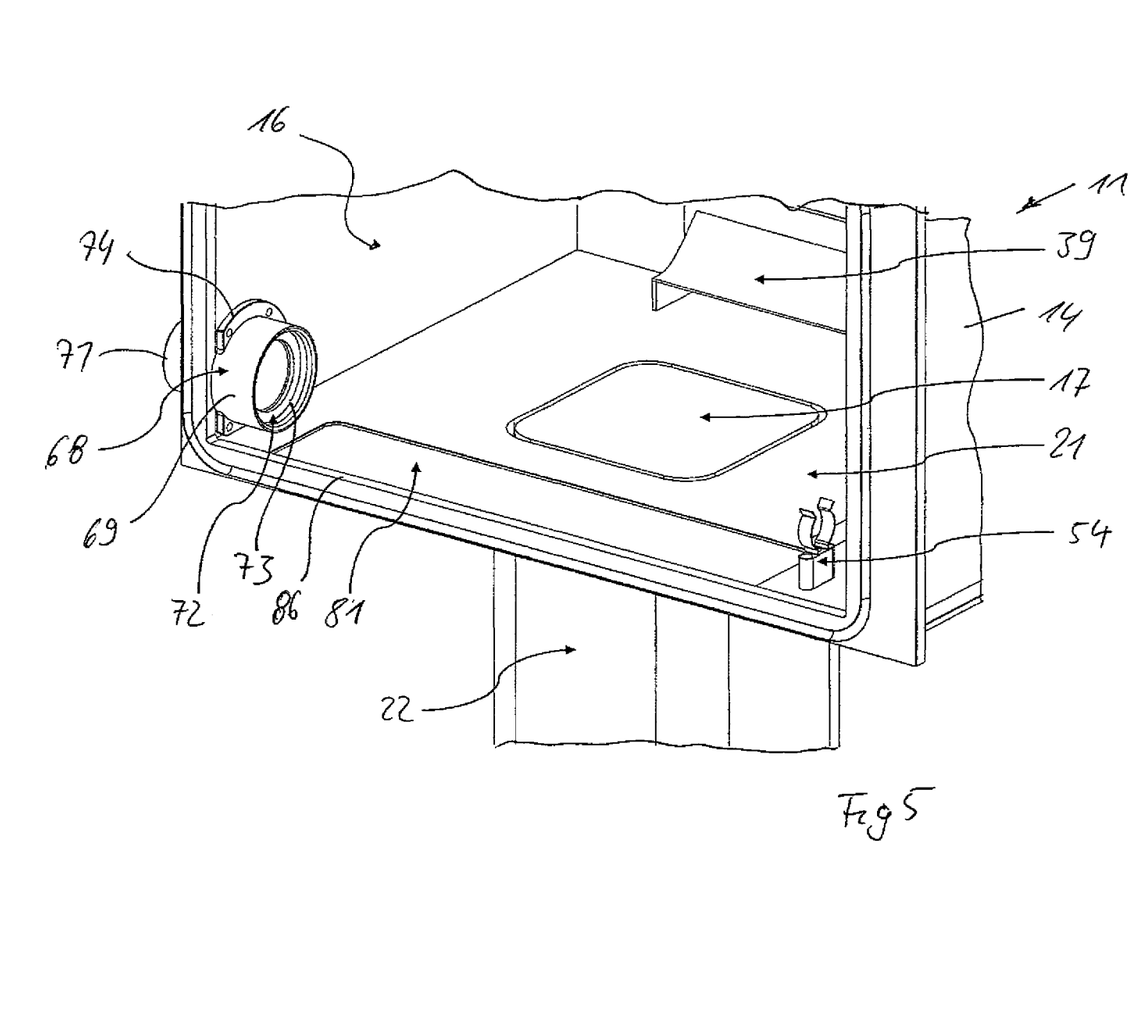
FIG. 5 is a perspective view of a base of the process chamber of the apparatus according to FIG. 1 with the suction tube removed.

FIG. 5 shows a perspective view into the process chamber 16. The suction tube 42 has been removed from the process chamber 16.

Adjacent to the opening 28 of the process chamber 16, a depression 81 is provided in the base 21 of the process chamber 16. The geometry of the rest surface 83 on the wall portion 84 of the intake opening 43 corresponds to the geometry of the depression 81, so that an interlocking arrangement of the rest surface 83 in the depression 81 is provided. The side edges of the wall portion 84 thus form alignment elements 85, in order to allow the suction tube 42 to be positioned correctly relative to the base 21 of the process chamber 16. Furthermore, the recess on the suction tube 42 preferably engages a step 86 extending to the opening 28 as a further alignment element 85.

For removing the suction tube 42 from the process chamber 16, the holding element 53 can be released from the holding device 54 by a removal movement in the Z-direction. At the same time, a pivoting movement of the suction tube 42 is initiated, because the connection port 51 is initially still positioned in the receiving socket 69 of the adapter 68. After the holding element 53 has been released from the holding device 54, the connection port 51 can be released from the receiving socket 69 of the adapter 68. The connection port 51 can then be pulled out of the receiving socket 69 and the suction tube 42 can be removed from the process chamber 16. The configuration of the rounded transition 62 at the connection port 51 facilitates this pivoting movement by removal of the suction tube 42. The same applies for the installation of the suction tube 42 in the process chamber, which is carried out in the reverse order.

| | |
|---|---|
| 11. | Apparatus |
| 12. | Component |
| 13. | Building material |
| 14. | Housing |
| 15. | Beam source |
| 16. | Process chamber |
| 17. | Building platform |
| 18. | Beam deflection device |
| 19. | Overflow slot |
| 20. | |
| 21. | Base of 16 |
| 22. | Interchangeable container |
| 23. | Front side |
| 24. | Door |
| 25. | Beam |
| 26. | Safety closure |
| 27. | Handle |
| 28. | Opening |
| 29. | Sealing |
| 30. | Application and levelling device |
| 31. | Protective gas circulation system |
| 32. | |
| 33. | |
| 35. | Protecting gas stream |
| 36. | Filter device |
| 37. | Low pressure generating device |
| 38. | Conveying line |
| 39. | Inlet opening |
| 40. | |
| 41. | Suction device |
| 42. | Suction tube |
| 43. | Intake opening |
| 45. | Outlet opening |
| 46. | Suction line |
| 47. | |
| 50. | |
| 51. | Connection port |
| 52. | |
| 53. | Holding element |
| 54. | Holding device |
| 55. | Holding lugs |
| 56. | Side wall of 16 |
| 57. | Side wall of 16 |
| 58. | Ceiling of 16 |
| 59. | Rear wall of 16 |
| 60. | |
| 61. | End face of 51 |
| 62. | Transition of 51 |
| 63. | Cylindrical portion of 51 |
| 64. | Sealing |
| 65. | Docking interface |
| 66. | |
| 67. | Through-passage |
| 68. | Adapter |
| 69. | Receiving socket |
| 70. | |
| 71. | Tubular section |
| 72. | End face |
| 73. | Sealing |
| 74. | Shoulder |
| 75. | |
| 76. | |
| 77. | |
| 78. | |
| 79. | |
| 80. | |
| 81. | Depression |
| 82. | |
| 83. | Rest surface |
| 84. | Wall portion |
| 85. | Alignment elements |
| 86. | Step |
| 87. | |
| 88. | |
| 89. | |
| 90. | |
| 91. | |
| 92. | |
| 93. | |
| 94. | |
| 95. | |

-continued 96.
97.
98.
99.
100.

The invention claimed is:

1. A suction device for sucking a process gas from a process chamber of an apparatus for producing a three-dimensional component by selectively solidifying a building material, applied layer by layer, by means of a beam acting on the building material,
having a suction tube which has an outlet opening at an end face, to which a suction line is connectable,
having an intake opening which extends in the longitudinal direction of the suction tube and is slot-shaped,
wherein
there is provided at one end of the suction tube the outlet opening of the suction tube having a connection port which is insertable into a docking interface on or in the process chamber, and
at an opposite end of said outlet opening of the suction tube there is provided a holding element which is configured to be releasably fastened to a holding device associated with an opening of the process chamber.

2. The suction device according to claim 1, wherein a rounded transition is provided between an end face of the connection port and a cylindrical portion of the connection port.

3. The suction device according to claim 1, wherein there is provided an adapter which is fastenable in the process chamber and has a receiving socket into which the connection port of the suction tube is insertable to form the docking interface, and the adapter, opposite the connection port, has a tubular section for connection of the suction line.

4. The suction device according to claim 3, wherein the adapter has a radially outer circumferential shoulder for abutment on and/or fastening to a through-passage in a side wall of the process chamber.

5. The suction device according to claim 3, wherein, in the receiving socket of the adapter, a radially oriented end face is provided with a seal which abuts the end face of the connection port and forms an axial seal between the adapter and the connection port of the suction tube.

6. The suction device according to claim 3, wherein the receiving socket of the adapter engages externally around the connection port of the suction tube and, by means of the seal provided on the cylindrical portion of the connection port, a radial seal is formed between the receiving socket and the connection port of the suction tube.

7. The suction device according to claim 1, wherein there is provided on an underside of the intake opening of the suction tube a rest surface which has one or more alignment elements for positioning the suction tube relative to a base of the process chamber.

8. The suction device according to claim 7, wherein the at least one alignment element is formed by a side edge and/or at least one recess in the rest surface, which is positionable in a depression in the base of the process chamber.

9. The suction device according to claim 1, wherein the holding element is connectable to the holding device by frictional and/or interlocking engagement.

10. The suction device according to claim 9, wherein the holding element is of cylindrical form and is insertable into the holding device comprising a clip with holding lugs.

11. An apparatus for producing a three-dimensional component by selectively solidifying a building material, applied layer by layer, by means of a beam acting on the building material,
having a process chamber which comprises a base which has a work surface oriented in an X-Y plane,
having at least one building platform which is moveable up and down relative to the work surface,
having an application and levelling device which is displaceable along the work surface and feeds powdered building material to the building platform,
having a protective gas circulation system which has at least one intake opening for feeding a process gas into the process chamber and an outlet opening for sucking contaminated process gas from the process chamber,
having an opening which is provided in a front side of the process chamber and which is closeable by a door,
wherein
the intake opening is provided in a suction tube of a suction device according to claim 1, and
the suction tube is removable from the process chamber.

12. The apparatus according to claim 11, wherein the suction device is positioned adjacent to the opening of the process chamber, and the at least one intake opening for feeding in the process gas is provided at least in the rear wall and/or the at least one side wall of the process chamber.

13. The apparatus according to claim 11, wherein a through-passage is provided in a side wall of the process chamber adjacent to the opening, into which through-passage an adapter is insertable.

14. The apparatus according to claim 13, wherein a tubular section of the adapter is connectable to the suction line outside the process chamber.

15. The apparatus according to claim 13, wherein, associated with the side wall of the process chamber opposite the through-passage, the holding device is fastened to the work surface or the side wall of the process chamber.

16. The apparatus according to claim 13, wherein there is provided in the work surface of the base of the process chamber a depression which extends in a region between the through-passage and the holding device.

17. The apparatus according to claim 16, wherein the depression is adjacent to the opening in the process chamber.

18. The apparatus according to claim 11, wherein, for positioning in the process chamber, the suction tube is first insertable with the connection port into the adapter and then, by a pivoting movement, while maintaining the fitted position of the connection port in the receiving socket of the adapter, the holding element is fixable in the holding device or by the holding device.

19. An apparatus for producing a three-dimensional component by selectively solidifying a building material, applied layer by layer, by means of a beam acting on the building material,
having a process chamber which comprises a base which has a work surface oriented in an X-Y plane,
having at least one building platform which is moveable up and down relative to the work surface,
having a metering device which is displaceable along the work surface and feeds powdered building material to the building platform,
having a protective gas circulation system which has at least one intake opening for feeding a process gas into the process chamber and an outlet opening for sucking contaminated process gas from the process chamber,
having an opening which is provided in a front side of the process chamber and which is closeable by a door, wherein
   the intake opening is provided in a suction tube of a suction device according to claim 1, and
   the suction tube is removable from the process chamber.

\* \* \* \* \*

UNITED STATES PATENT AND TRADEMARK OFFICE
CERTIFICATE OF CORRECTION

Page 1 of 1

PATENT NO. : 12,179,270 B2
APPLICATION NO. : 17/814906
DATED : October 22, 2024
INVENTOR(S) : Michael Volk It is certified that error appears in the above-identified patent and that said Letters Patent is hereby corrected as shown below:

On the Title Page

Add:
--Foreign Application Priority Data
Jul. 26, 2022 (DE) 10 2021 119 304.4--

Signed and Sealed this
Second Day of September, 2025

Coke Morgan Stewart
*Acting Director of the United States Patent and Trademark Office*